US009417631B2

(12) United States Patent
Ferguson et al.

(10) Patent No.: US 9,417,631 B2
(45) Date of Patent: *Aug. 16, 2016

(54) USE OF PRIOR MAPS FOR ESTIMATION OF LANE BOUNDARIES

(71) Applicant: Google Inc., Mountain View, CA (US)

(72) Inventors: David Ian Ferguson, Mountain View, CA (US); David Harrison Silver, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/062,853

(22) Filed: Mar. 7, 2016

(65) Prior Publication Data

US 2016/0187887 A1 Jun. 30, 2016

Related U.S. Application Data

(63) Continuation of application No. 14/086,366, filed on Nov. 21, 2013, now Pat. No. 9,310,804.

(51) Int. Cl.
| | |
|---|---|
| B60W 40/00 | (2006.01) |
| G05D 1/02 | (2006.01) |
| B60W 30/12 | (2006.01) |
| G05D 1/00 | (2006.01) |

(52) U.S. Cl.
CPC ............. *G05D 1/0212* (2013.01); *B60W 30/12* (2013.01); *B60W 40/00* (2013.01); *G05D 1/00* (2013.01); *G05D 1/0231* (2013.01); *G05D 1/0246* (2013.01); *G05D 1/0274* (2013.01); *G05D 1/021* (2013.01)

(58) Field of Classification Search
None
See application file for complete search history.

(56) References Cited

U.S. PATENT DOCUMENTS

| | | | | |
|---|---|---|---|---|
| 6,850,628 | B2 * | 2/2005 | Shirato | G06K 9/00798 382/104 |
| 6,868,168 | B2 * | 3/2005 | Tsuji | G05D 1/0246 340/933 |
| 8,447,484 | B2 * | 5/2013 | Saito | B60W 30/12 382/184 |

(Continued)

OTHER PUBLICATIONS

Raphael Labayrade, How Autonomous Mapping Can Help a Road Lane Detection System?, IEEE International Conference on Control, Automation, Robotics, and Vision, Singapore, Dec. 2006.

*Primary Examiner* — Redhwan K Mawari
*Assistant Examiner* — Edward Torchinsky
(74) *Attorney, Agent, or Firm* — McDonnell Boehnen Hulbert & Berghoff LLP

(57) ABSTRACT

Disclosed herein are methods and systems for using prior maps for estimation of lane boundaries or other features within an environment. An example method may include receiving a location of a plurality of detected points on a roadway in an environment of an autonomous vehicle, determining, from a prior map of the roadway, a location of a plurality of reference points from a boundary marker on the roadway that correspond to the detected points on the roadway, determining distances between the detected points and the corresponding reference points based on the location of the detected points in the environment and the location of the reference points from the prior map of the roadway, determining a confidence buffer representing a threshold amount of variation associated with the prior map based at least in part on the distances between the detected points and the corresponding reference points, selecting one or more of the detected points such that the distance between a selected detected point and a corresponding reference point is less than the confidence buffer, and using the selected points to direct the autonomous vehicle along the roadway.

21 Claims, 11 Drawing Sheets

(56) References Cited

U.S. PATENT DOCUMENTS

| | | |
|---|---|---|
| 8,521,352 B1 | 8/2013 | Ferguson et al. |
| 8,923,648 B2 * | 12/2014 | Kurpinski ............ G06T 3/4038 345/629 |
| 2010/0324782 A1 | 12/2010 | Gupta et al. |
| 2012/0310465 A1 | 12/2012 | Boatright et al. |
| 2012/0314070 A1 | 12/2012 | Zhang et al. |
| 2014/0160295 A1 * | 6/2014 | Kyomitsu ............ G08G 1/0112 348/159 |

* cited by examiner

Top View

Top View

Top View

USE OF PRIOR MAPS FOR ESTIMATION OF LANE BOUNDARIES

CROSS REFERENCE TO RELATED APPLICATION

The present application is a continuation of U.S. patent application Ser. No. 14/086,366 filed on Nov. 21, 2013, the contents of which are incorporated herein by reference, as if fully set forth in this description.

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller may adjust the directional controls of the vehicle to cause the vehicle to navigate around the obstacle.

SUMMARY

Within examples, methods and systems are provided for using prior maps for estimation of lane boundaries or other features within an environment, such as an environment of an autonomous vehicle. Locations of detected points on a roadway within the environment may first be received, such as from sensors on an autonomous vehicle. Locations of reference points from a boundary marker on the roadway corresponding to the detected points may then be determined from a prior map of the environment. Distances between the detected points and corresponding reference points may be determined. The distances may then be used to determine a confidence buffer representing a threshold level of variation associated with the prior map. Some of the detected points may then be selected so that the distance between those detected points and the corresponding reference points is less than the confidence buffer. The selected points may be a current representation of the boundary marker used to direct the vehicle along the roadway.

In a first aspect, a method is provided. The method may include receiving a location of a plurality of detected points on a roadway in an environment of an autonomous vehicle, determining, from a prior map of the roadway, a location of a plurality of reference points from a boundary marker on the roadway that correspond to the detected points on the roadway, determining distances between the detected points and the corresponding reference points based on the location of the detected points in the environment and the location of the reference points from the prior map of the roadway, determining a confidence buffer representing a threshold amount of variation associated with the prior map based at least in part on the distances between the detected points and the corresponding reference points, selecting one or more of the detected points such that the distance between a selected detected point and a corresponding reference point is less than the confidence buffer, wherein the selected points are a current representation of the boundary marker on the roadway, and using the selected points to direct the autonomous vehicle along the roadway.

In a second aspect, a vehicle is provided. The vehicle may include a computing system configured to determine a location of a plurality of detected points on a roadway in an environment based at least in part on sensor data from at least one sensor on the vehicle, determine, from a prior map of the roadway, a location of a plurality of reference points from a boundary marker on the roadway that correspond to the detected points on the roadway, determine distances between the detected points and the corresponding reference points based on the location of the detected points in the environment and the location of the reference points from the prior map of the roadway, determine a confidence buffer representing a threshold amount of variation associated with the prior map based at least in part on the distances between the detected points and the corresponding reference points, select one or more of the detected points such that the distance between a selected detected point and a corresponding reference point is less than the confidence buffer, wherein the selected points are a current representation of the boundary marker on the roadway, and use the selected points to direct the vehicle along the roadway.

In a third aspect, a non-transitory computer readable medium having stored therein instructions that when executed by a computing system, cause the computing system to perform functions is disclosed. The functions may include receiving a location of a plurality of detected points on a roadway in an environment of an autonomous vehicle, determining, from a prior map of the roadway, a location of a plurality of reference points from a boundary marker on the roadway that correspond to the detected points on the roadway, determining distances between the detected points and the corresponding reference points based on the location of the detected points in the environment and the location of the reference points from the prior map of the roadway, determining a confidence buffer representing a threshold amount of variation associated with the prior map based at least in part on the distances between the detected points and the corresponding reference points, selecting one or more of the detected points such that the distance between a selected detected point and a corresponding reference point is less than the confidence buffer, wherein the selected points are a current representation of the boundary marker on the roadway, and using the selected points to direct the autonomous vehicle along the roadway.

In a fourth aspect, example systems may provide means for receiving a location of a plurality of detected points on a roadway in an environment of an autonomous vehicle, means for determining, from a prior map of the roadway, a location of a plurality of reference points from a boundary marker on the roadway that correspond to the detected points on the roadway, means for determining distances between the detected points and the corresponding reference points based on the location of the detected points in the environment and the location of the reference points from the prior map of the roadway, means for determining a confidence buffer representing a threshold amount of variation associated with the prior map based at least in part on the distances between the detected points and the corresponding reference points, means for selecting one or more of the detected points such that the distance between a selected detected point and a corresponding reference point is less than the confidence buffer, wherein the selected points are a current representation of the boundary marker on the roadway, and means for using the selected points to direct the autonomous vehicle along the roadway.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
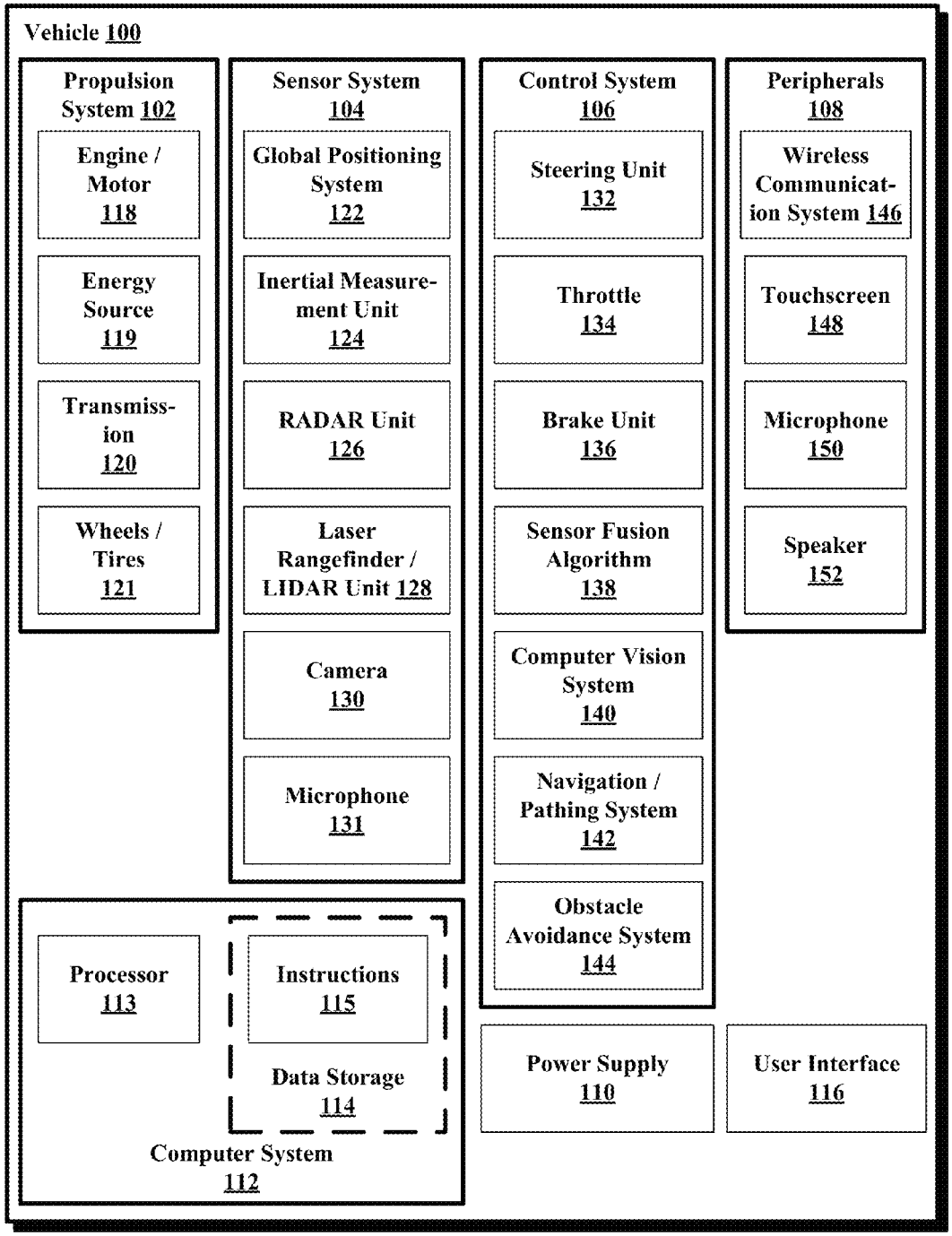
FIG. 1 is a functional block diagram illustrating a vehicle, in accordance with an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

Autonomous vehicles often rely on maps of an environment to determine how to steer and stay within lanes. However, maps of an environment can be inaccurate when things have changed in the environment, such as when a lane boundary has been repainted. Autonomous vehicles therefore often use real-time estimates of lane boundaries based on points in the environment which may be detected by sensors on the vehicles, such as lasers or cameras. In some instances, these real-time estimates may be inaccurate or noisy because of environmental features, such as when other vehicles obstruct the view of lane boundaries or when paint is spilled on the road, for example.

Example embodiments may provide methods of filtering detected points within an environment to reduce noise and/or increase the accuracy of boundary marker detection. In particular, prior maps of an environment may be used to filter out detected points that are unlikely to be real points on a boundary line. Those points that have a high likelihood of corresponding to the lane boundary may be selected and used to steer a vehicle.

In one example, a certain number of detected points within an environment may be received from one or more sensors, such as cameras or laser-based sensors on an autonomous vehicle. Then, reference points may be determined from a previously stored map of the environment, such as by selecting points from previously mapped curves representing lane boundaries within the environment. For each detected point, a corresponding reference point may be identified. In particular, a corresponding reference point may be chosen based on where a particular detected points is expected to be within the environment, assuming the prior map is accurate and nothing has changed from the prior map (i.e., a lane boundary has not been repainted).

Distances between detected points and corresponding reference points may then be determined. For instance, the three-dimensional (3D) coordinates of a detected point may be determined based on sensor data of the environment. The 3D coordinates of a corresponding reference point may be determined based on a prior map of the environment, which may store 3D coordinates directly or store the data in another form from which 3D coordinates can be derived. A 3D distance between the detected point and the corresponding reference point may then be determined using the 3D coordinates of the two points. In other examples, the distances between detected points and corresponding reference points may only be determined in certain directions, such as the translational distance along a particular axis.

A confidence buffer may then be determined based on the distances between detected points and corresponding reference points. The confidence buffer may represent a threshold amount of variation from the prior map that will be used to filter detected points. In some examples, the confidence buffer may be the same amount in every direction. In other examples, the confidence buffer may be a different amount depending on the direction of the distance between a detected point and a corresponding reference point.

In further examples, the confidence buffer may be chosen by determining and periodically updating a confidence metric associated with a level of confidence in the prior map. The confidence metric may indicate a likelihood, such as a 0-to-1 index, that a prior map of the environment is inaccurate. For instance, if most of the detected points (e.g., 75% or more) close to the vehicle match up well with reference points on the map, it may be determined that the prior map has a low likelihood of being inaccurate. If the likelihood that the prior map is inaccurate is low, a narrow confidence buffer may be selected. Conversely, if the likelihood that the prior map is inaccurate is high, a greater confidence buffer may be selected.

The confidence buffer may then be used to filter out detected points that are unlikely to be real points on a boundary line. In particular, a detected point may only be selected if its distance from a corresponding reference point on the prior map is less than the confidence buffer. Therefore, in situations where the prior map is likely to be accurate, a low confidence buffer may be chosen to filter out detected points aggressively. Conversely, if the prior map is likely to be inaccurate, a higher confidence buffer may be chosen to filter out detected points less aggressively (or not at all).

In some examples, determining the confidence buffer may involve determining a percentage of detected points that have been filtered out. Rather than predicting a confidence level associated with a prior map of the environment in advance, an example system may filter based on some initial chosen threshold and then periodically determine how many detected points are being filtered out. If most of the detected points are being filtered out (e.g., more than 50%), it may be determined that the prior map is likely to be inaccurate and the confidence buffer may be increased.

In other examples, trends in the distance between detected points and corresponding reference points may be identified to determine the confidence buffer. If the prior map is inaccurate, it may be incorrect in a consistent way, such as when a lane boundary is slowly shifted to the right over a distance of several hundred meters. Accordingly, a confidence buffer may be chosen so that detected points which follow an identified trend in a consistent manner are selected.

The selected points may then be a current representation of a boundary marker in the environment. In some examples, the selected points may be used by themselves or in combination with other data about the environment to direct an autonomous vehicle. Example embodiments may also be used in other types of vehicle navigation systems, driver assistance products, or mapping products as well. Additionally, example methods could be used in other settings, such as factories where painted lines, magnets, or fiducial markers could be mapped. In other examples, methods may be used to map other aspects in an environment besides boundary lines, such as natural features, trees, walls, corners of objects, etc.

Utilizing the methods and systems described herein may therefore facilitate the task of determining the location of lane boundaries and other features of an environment of an autonomous vehicle using detected points from sensors on the vehicle in conjunction with reference points from a prior map of the environment.

Example systems will now be described in greater detail. Generally, an example system may be implemented in or may take the form of a computing device. However, an example system may also be implemented in or take the form of other devices or may be included within vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

FIG. 1 is a functional block diagram depicting a vehicle 100 according to an example embodiment. The vehicle 100 is configured to operate fully or partially in an autonomous mode, and thus may be referred to as an "autonomous vehicle." For example, a computer system 112 may control the vehicle 100 while in an autonomous mode via control instructions to a control system 106 for the vehicle 100. The computer system 112 may receive information from a sensor system 104, and base one or more control processes (such as the setting a heading so as to avoid a detected obstacle) upon the received information in an automated fashion.

The vehicle 100 may be fully autonomous or partially autonomous. In a partially autonomous vehicle some functions can optionally be manually controlled (e.g., by a driver) some or all of the time. Further, a partially autonomous vehicle may be configured to switch between a fully-manual operation mode and a partially-autonomous and/or a fully-autonomous operation mode.

The vehicle 100 may include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem may include multiple elements. Further, each of the subsystems and elements of vehicle 100 may be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion to the vehicle 100. Depending upon the embodiment, the propulsion system 102 may include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the propulsion system 102 may include multiple types of engines and/or motors. For instance, a gas-electric hybrid vehicle may include a gasoline engine and an electric motor. Other examples are possible as well.

The energy source 119 may represent a source of energy that may, in full or in part, power the engine/motor 118. That is, the engine/motor 118 may be configured to convert the energy source 119 into mechanical energy to operate the transmission 120. Examples of energy sources 119 may include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 may also provide energy for other systems of the automobile 100.

The transmission 120 may include elements that are operable to transmit mechanical power from the engine/motor 118 to the wheels/tires 121. Such elements may include a gearbox, a clutch, a differential, a drive shaft, and/or axle(s), etc. The transmission 120 may include other elements as well. The drive shafts may include one or more axles that may be coupled to the one or more wheels/tires 121.

The wheels/tires 121 may be arranged to stably support the vehicle 100 while providing frictional traction with a surface, such as a road, upon which the vehicle 100 moves. Accordingly, the wheels/tires 121 of vehicle 100 may be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 may represent at least one wheel that is fixedly attached to the transmission 120 and at least one tire coupled to a rim of the wheel that could make contact with the driving surface. The wheels/tires 121 may include any combination of metal and rubber, or another combination of materials.

The sensor system 104 generally includes one or more sensors configured to detect information about the environment surrounding the vehicle 100. For example, the sensor system 104 may include a Global Positioning System (GPS) 122, an inertial measurement unit (IMU) 124, a RADAR unit 126, a laser rangefinder/LIDAR unit 128, a camera 130, and/ or a microphone 131. The sensor system 104 may also include sensors configured to monitor internal systems of the vehicle 100 (e.g., $O_2$ monitor, fuel gauge, engine oil temperature, wheel speed sensors, etc.). One or more of the sensors included in the sensor system 104 may be configured to be actuated separately and/or collectively in order to modify a position and/or an orientation of the one or more sensors.

The GPS 122 may be any sensor configured to estimate a geographic location of the vehicle 100. To this end, GPS 122 may include a transceiver operable to provide information regarding the position of the vehicle 100 with respect to the Earth.

The IMU 124 may include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 may include one or more devices configured to capture a plurality of images of the environment surrounding the vehicle 100. The camera 130 may be a still camera or a video camera. In some embodiments, the camera 130 may be mechanically movable such as by rotating and/or tilting a platform to which the camera is mounted. As such, a control process of the vehicle 100 may be implemented to control the movement of the camera 130.

The sensor system 104 may also include a microphone 131. The microphone 131 may be configured to capture sound from the environment surrounding the vehicle 100. In some cases, multiple microphones can be arranged as a microphone array, or possibly as multiple microphone arrays.

The control system 106 may be configured to control operation(s) of the vehicle 100 and its components. Accordingly, the control system 106 may include various elements include steering unit 132, throttle 134, brake unit 136, a sensor fusion algorithm 138, a computer vision system 140, a navigation/pathing system 142, and an obstacle avoidance system 144, etc.

The steering unit 132 may represent any combination of mechanisms that may be operable to adjust the heading of vehicle 100. For example, the steering unit 132 can adjust the axis (or axes) of one or more of the wheels/tires 121 so as to effect turning of the vehicle 100. The throttle 134 may be configured to control, for instance, the operating speed of the engine/motor 118 and, in turn, control the speed of the vehicle 100. The brake unit 136 may include any combination of mechanisms configured to decelerate the vehicle 100. The brake unit 136 may, for example, use friction to slow the wheels/tires 121. In other embodiments, the brake unit 136 inductively decelerates the wheels/tires 121 by a regenerative braking process to convert kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 may include, for instance, a Kalman filter, Bayesian network, or other algorithm. The sensor fusion algorithm 138 may provide various assessments based on the data from sensor system 104. Depending upon the embodiment, the assessments may include evaluations of individual objects and/or features in the environment of vehicle 100, evaluations of particular situations, and/or evaluations of possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, other vehicles, pedestrians, and/or obstacles, etc. The computer vision system 140 may use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the vehicle 100. For example, the navigation/pathing system 142 may determine a series of speeds and directional headings to effect movement of the vehicle 100 along a path that substantially avoids perceived obstacles while generally advancing the vehicle 100 along a roadway-based path leading to an ultimate destination, which may be set according to user inputs via the user interface 116, for example. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 may represent a control system configured to identify, evaluate, and avoid or otherwise negotiate potential obstacles in the environment of the vehicle 100. For example, the obstacle avoidance system 144 may effect changes in the navigation of the vehicle 100 by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 may be configured such that a swerving maneuver is not undertaken when other sensor systems detect vehicles, construction barriers, other obstacles, etc. in the region adjacent the vehicle 100 that would be swerved into. In some embodiments, the obstacle avoidance system 144 may automatically select the maneuver that is both available and maximizes safety of occupants of the vehicle. For example, the obstacle avoidance system 144 may select an avoidance maneuver predicted to cause the least amount of acceleration in a passenger cabin of the vehicle 100.

The control system 106 may additionally or alternatively include components other than those shown and described.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. may include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of the vehicle 100, and convey information from the user indicated via the touchscreen 148 to the user interface 116. The touchscreen 148 can be configured to sense both touch positions and touch gestures from the finger of a user (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from an occupant of the vehicle 100. Similarly, the speaker 152 can be configured to output audio to the occupant of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle 100 that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, the wireless communication system 146 can communicate with a wireless local area network (WLAN), for example, using WiFi. In some embodiments, the wireless communication system 146 could communicate directly with a device, for example, using an infrared link, Bluetooth, and/or ZigBee. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

The power supply 110 may provide power to components of the vehicle 100, such as electronics in the peripherals 108, the computer system 112, the sensor system 104, etc. The power supply 110 can include a rechargeable lithium-ion or lead-acid battery for storing and discharging electrical energy to the various powered components, for example. In some embodiments, one or more banks of batteries may be configured to provide electrical power. In some embodiments, the power supply 110 and the energy source 119 can be implemented together, as in some all-electric cars.

Many or all of the functions of the vehicle 100 may be controlled via the computer system 112 that receives inputs from the sensor system 104, the peripherals 108, etc., and communicates appropriate control signals to the propulsion system 102, the control system 106, the peripherals 108, etc. to effect automatic operation of the vehicle 100 based on its surroundings. The computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various automobile functions, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100, and associated computer system 112, provides information to and/or receives input from, a user of the vehicle 100, such as an occupant in a passenger cabin of the vehicle 100. Accordingly, the vehicle 100 may include a user interface 116 for providing information to or receiving input from a user of vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 may utilize input from the control system 106 to control the steering unit 132 to avoid an obstacle detected by the sensor system 104 and the obstacle avoidance system 144. The computer system 112 may be configured to control many aspects of the vehicle 100 and its subsystems. Generally, however, provisions are made for manually overriding automated controller-driven operation, such as in the event of an emergency, or merely in response to a user-activated override, etc.

The components of the vehicle 100 described herein may be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in the data storage 114, and/or by other techniques.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 may generally be communicatively coupled together in a wired and/or wireless fashion.

Figure 2:
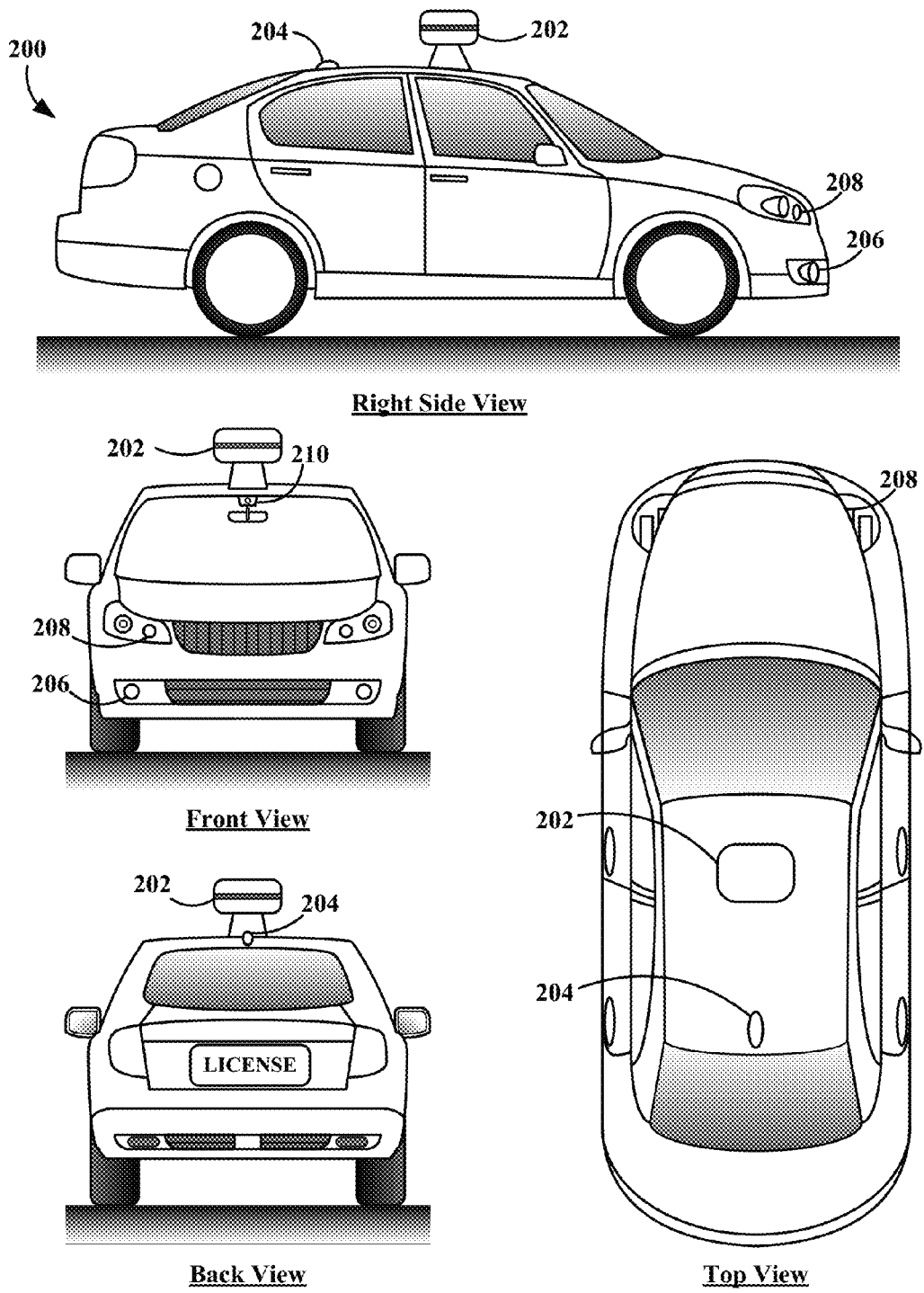
FIG. 2 is a vehicle, in accordance with an example embodiment.

FIG. 2 depicts an example vehicle 200 that can include all or most of the functions described in connection with the vehicle 100 in reference to FIG. 1. Although example vehicle 200 is illustrated in FIG. 2 as a four-wheel sedan-type car for illustrative purposes, the present disclosure is not so limited. For instance, example vehicle 200 can represent any type of vehicle mentioned herein.

Example vehicle 200 includes a sensor unit 202, a wireless communication system 204, a LIDAR unit 206, a laser rangefinder unit 208, and a camera 210. Furthermore, example vehicle 200 may include any of the components described in connection with vehicle 100 of FIG. 1.

The sensor unit 202 is mounted atop example vehicle 200 and includes one or more sensors configured to detect information about an environment surrounding example vehicle 200, and output indications of the information. For example, the sensor unit 202 may include any combination of cameras, RADARs, LIDARs, range finders, and acoustic sensors. The sensor unit 202 may include one or more movable mounts that may be operable to adjust the orientation of one or more sensors in the sensor unit 202. In one embodiment, the movable mount may include a rotating platform that may scan sensors so as to obtain information from each direction around example vehicle 200. In another embodiment, the movable mount of the sensor unit 202 may be moveable in a scanning fashion within a particular range of angles and/or azimuths. The sensor unit 202 may be mounted atop the roof of a car, for instance, however other mounting locations are possible. Additionally, the sensors of the sensor unit 202 may be distributed in different locations and need not be collocated in a single location. Some possible sensor types and mounting locations include the LIDAR unit 206 and laser rangefinder unit 208. Furthermore, each sensor of the sensor unit 202 may be configured to be moved or scanned independently of other sensors of the sensor unit 202.

The wireless communication system 204 may be located on a roof of example vehicle 200 as depicted in FIG. 2. Alternatively, the wireless communication system 204 may be located, fully or in part, elsewhere. The wireless communication system 204 may include wireless transmitters and receivers that may be configured to communicate with devices external or internal to example vehicle 200. Specifically, the wireless communication system 204 may include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be a photo-sensitive instrument, such as a still camera, a video camera, etc., that is configured to capture a plurality of images of the environment of example vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 may provide range information by using a structured light technique in which example vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, example vehicle 200 may determine the distance to the points on the object. The predetermined light pattern may comprise infrared light, or radiation at other suitable wavelengths for such measurements.

The camera 210 may be mounted inside a front windshield of example vehicle 200. Specifically, the camera 210 may be situated to capture images from a forward-looking view with respect to the orientation of example vehicle 200. Other mounting locations and viewing angles of the camera 210 may also be used, either inside or outside example vehicle 200.

The camera 210 can have associated optics operable to provide an adjustable field of view. Further, the camera 210 may be mounted to example vehicle 200 with a movable mount to vary a pointing angle of the camera 210, such as a via a pan/tilt mechanism.

Figure 3:
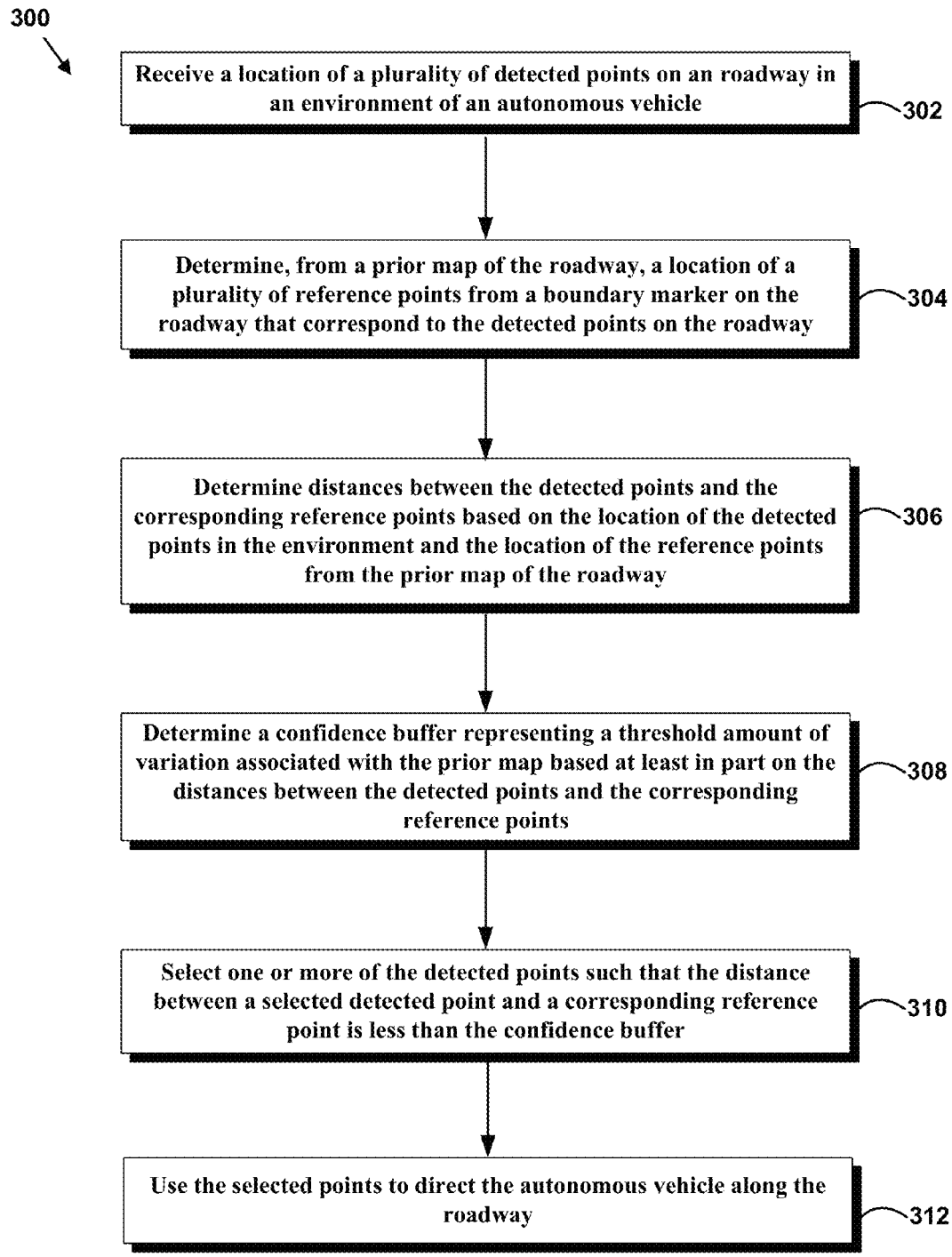
FIG. 3 illustrates a block diagram of a method, in accordance with an example embodiment.

In FIG. 3, a method 300 is provided for using a prior map of an environment to filter detected points on lane boundaries or other aspects within the environment. In some examples, method 300 may be carried out by a vehicle such as vehicle 100 and/or vehicle 200 as illustrated and described in reference to FIGS. 1 and 2, respectively. For example, the processes described herein may be carried out by camera 130 mounted to an autonomous vehicle (e.g., vehicle 200) in communication with computer system 112, sensor fusion algorithm 138, and/or computer vision system 140.

It should be understood that while method 300 is described here as being carried out by a computing system of an autonomous vehicle or a server system in contact with such a vehicle, the method could also be used in a number of different applications that may benefit from being able to filter detected points using a prior map of an environment. For instance, method 300 could be used by a different type of a vehicle or robot, a real-time mapping service, a GPS system, or other type of driver assistance system. Other possible applications exist as well.

Furthermore, it is noted that the functionality described in connection with the flowcharts described herein can be implemented as special-function and/or configured general-function hardware modules, portions of program code executed by a processor (e.g., the processor 113 in the computer system 112) for achieving specific logical functions, determinations, and/or steps described in connection with the flowchart shown in FIG. 3. Where used, program code can be stored on any type of computer-readable medium (e.g., computer-readable storage medium or non-transitory media, such as the data storage 114 described above with respect to computer system 112 and/or a computer program product 500 described below), for example, such as a storage device including a disk or hard drive.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

Example embodiments, such as method 300 of FIG. 3, may involve the use of a prior map of an environment. A prior map may store 3D locations of reference points in an environment directly, or the map may store location data in another format from which 3D locations of reference points can be derived. In some examples, some or all of the reference points may be stored or identified as curves corresponding to lane boundaries or other boundary lines within an environment. In additional examples, prior maps may also contain location information of objects, corners or other features of objects, signs, other points on a roadway, or any number of other locatable features within an environment.

Figure 4A:
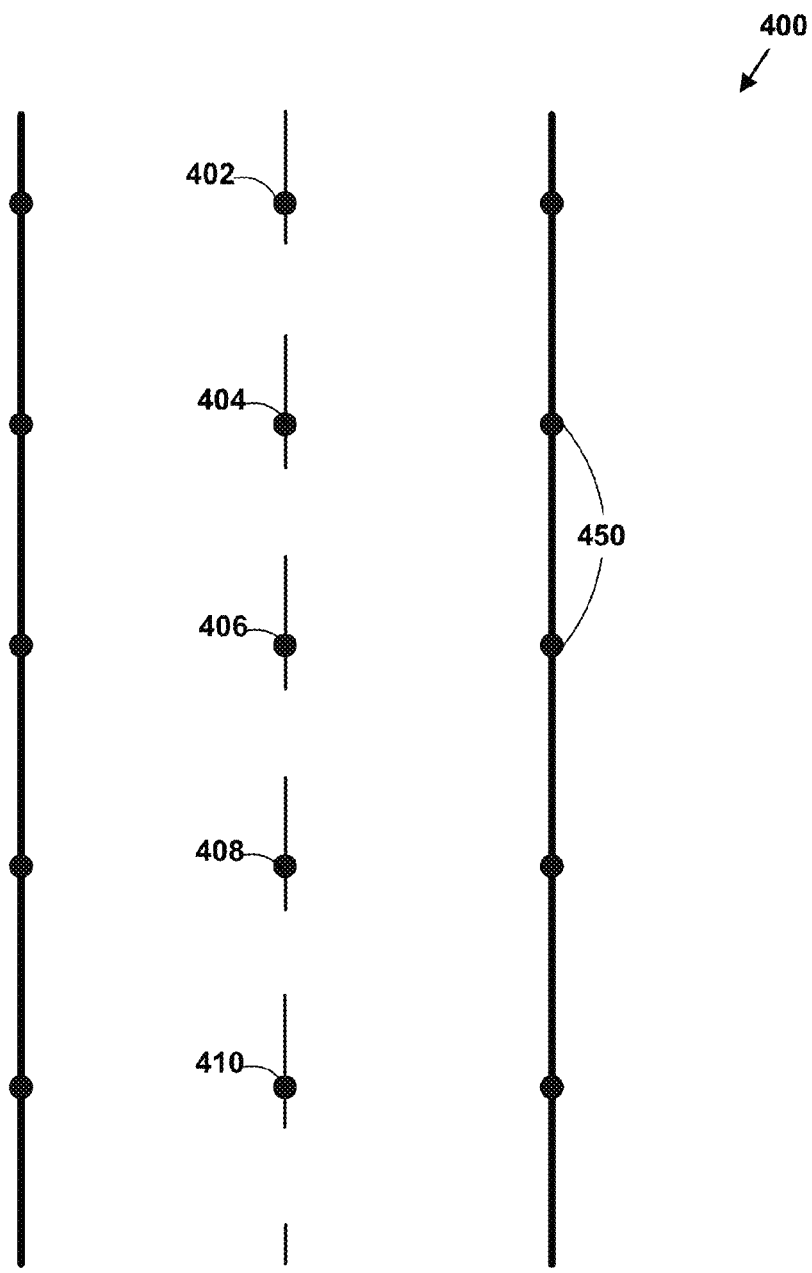
FIG. 4A is a top view of reference points from a prior map of an environment, in accordance with an example embodiment.

FIG. 4A is a top view of reference points in an environment 400, in accordance with an example embodiment. As shown in FIG. 4A, the reference points 402, 404, 406, 408, and 410 may be points located at equally spaced intervals of a lane boundary on a roadway. If the lane boundary includes a dashed line as shown, each reference point may correspond to a particular dash segment. In additional examples, some of the reference points 450 may be located along other lane boundaries, shoulders, or different types of markers or boundary lines on a roadway. The reference points may be distributed in other ways along a roadway or in different locations as well.

In further examples, the 3D location of one or more continuous curves of points in an environment may be stored. The 3D locations of some of the reference points may then be determined by sampling points from one or more of the continuous curves. For instance, the continuous curves may store the 3D location of lane boundaries on roads within an environment. Reference points may then be determined by selecting points at intervals along one or more of the curves. By using continuous curves, different intervals between reference points may be used depending on which reference points are needed for a particular application.

In additional examples, the reference points may include other points in the environment, such as points on signs, buildings, bridges, permanent objects or any other structures or features in the environment. These reference points may be sampled from continuous curves, sampled from other functions, or stored individually within a prior map. By storing reference points associated with different structures and features within the environment, example methods of filtering detected points can be used on detected points of additional aspects of the environment.

A shown by block 302, method 300 of FIG. 3 may initially involve receiving a location of a plurality of detected points on a roadway. For instance, a 3D location of certain points in the environment of an autonomous vehicle, such as the vehicle described in reference to FIGS. 1 and 2, may be determined using a camera, a RADAR sensor, a LIDAR sensor, another type of sensor, or some combination of sensors on the vehicle. In some examples, additional computations or transformations may be performed to determine the 3D locations of reference points based on images or other sensor data.

Figure 4B:
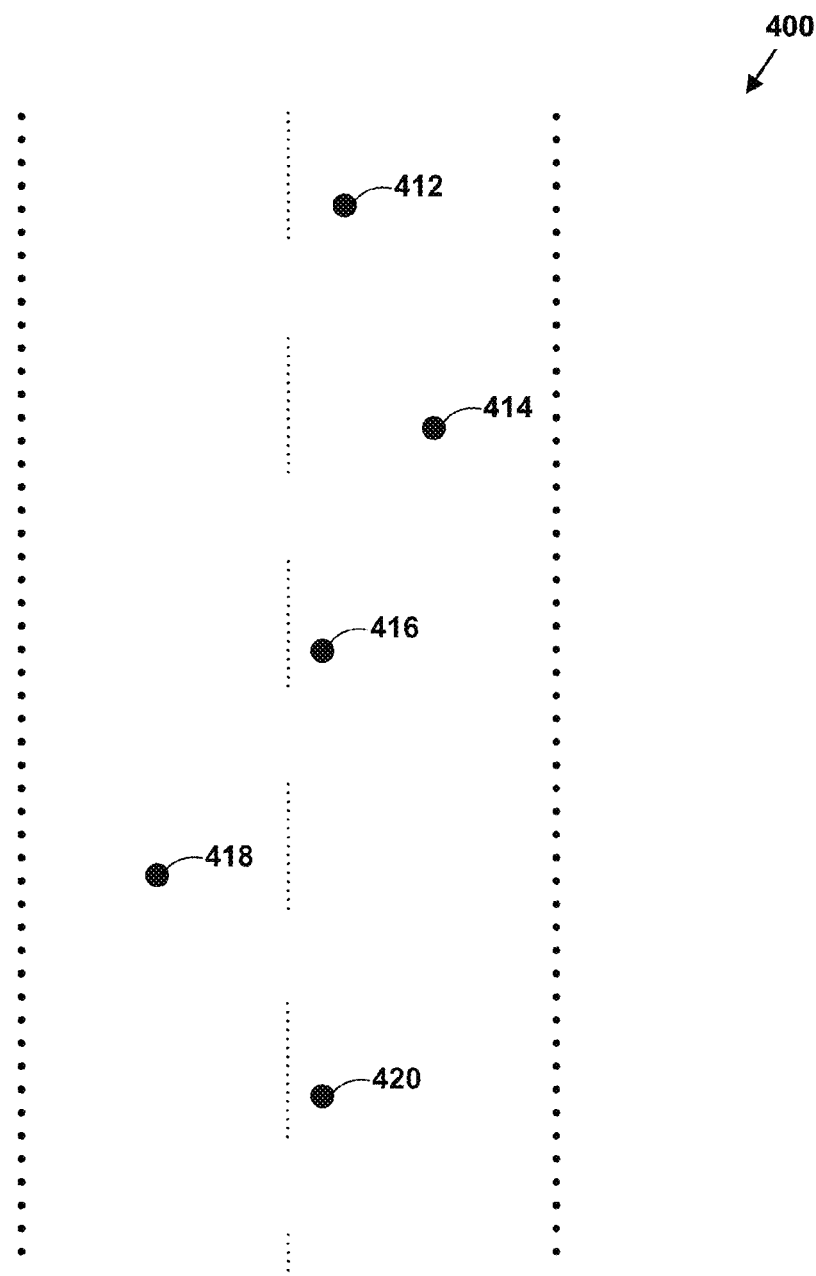
FIG. 4B is a top view of detected points in an environment, in accordance with an example embodiment.

In some examples, the detected points could be points which may correspond to a particular lane boundary on a roadway within the environment. For instance, referring to FIG. 4B, certain detected points 412, 414, 416, 418, and 420 may be received which may correspond to or be generated based on detection of the dashed center line on a road as shown. Note that the boundary lines on the road are shown as dotted lines here because the precise current position of the boundary lines may not be known. In particular, the locations of the boundary lines on the prior map may be inaccurate, such as when a boundary line was repainted in a different location. Detected points can be identified as potential points on a boundary line based on identifying properties such as their location, dimensions, or color (i.e., any bright yellow dash marks located on the surface of a road).

In further examples, detected points can be identified as potential points on a boundary line or other area of interest based on features of the boundary line or other area of interest relative to other local features within an environment. For instance, points belonging to a lane marker may be distinguishable both because the lane marker is a bright white color and because the surrounding area is not bright white. In some examples, surrounding features within the environment may be used to distinguish between detected points from features sharing the same color. For instance, a roadway may contain lane markers and crosswalks sharing the same bright white color. Points belonging to a lane marker may be distinguished from points belonging to a crosswalk because the area on the road surrounding the lane marker may be all black. Other examples of using surrounding local features to identify detected points as potential points belonging to an area of interest exist as well.

As shown by block 304, method 300 may involve determining, from a prior map of the roadway, a location of reference points from a boundary marker on the roadway. Reference points may be chosen that correspond to the detected points within the environment. For instance, a particular reference point may be chosen that corresponds to a particular detected point based on where the detected point was expected to be located within the environment based on the prior map. In some examples, a detected point may correspond with the next reference point in a sequence of reference points. For example, if the detected points relate to a lane boundary such as a dashed boundary line on a road, reference points may be chosen from the prior map at particular segments of the boundary line. In other examples, a reference point which corresponds with a particular detected point may be the reference point from the prior map that is closest to the detected point.

Figure 4C:
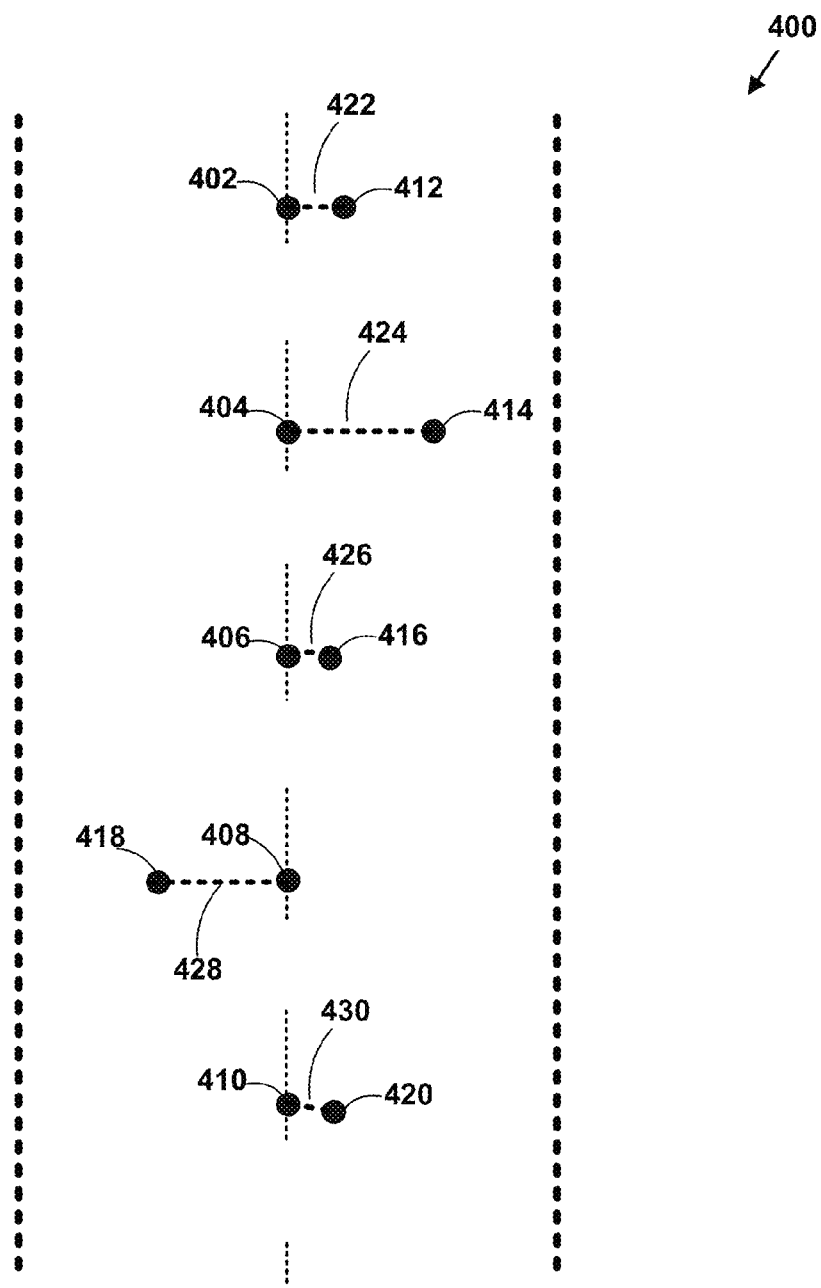
FIG. 4C is a schematic illustration of determining distances between the detected points from FIG. 4B and corresponding reference points from FIG. 4A, in accordance with an example embodiment.
Figure 4C:

FIG. 4C shows an example of determining reference points that correspond to detected points. As previously noted, locations of detected points 412, 414, 416, 418, and 420 may have been received based on one or more sensors of an environment. The detected points may each relate to portions of a lane boundary on a road, such as individual segments of the lane boundary. Reference points corresponding to the detected points may then be identified from the prior map based on where the individual segments of the lane boundary were located in the prior map. For instance, a particular reference point that is closest to the location of the detected point may be identified as a corresponding reference point. Accordingly, reference point 402 may correspond with detected point 412, reference point 404 may correspond with detected point 414, reference point 406 may correspond with detected point 416, reference point 408 may correspond with detected point 418, and reference point 410 may correspond with detected point 420 as shown in FIG. 4C.

As shown by block 306, method 300 of FIG. 3 may involve determining distances between the detected points and the corresponding reference points. The 3D locations of detected points may be determined from sensor data captured about the surrounding environment. The 3D locations of the reference points may be determined from the prior map of the environment, which may store locations directly or may store data in another form from which locations can be derived. Using the 3D locations of the detected points and the 3D location of the corresponding reference points, 3D distances between the pairs of points can be computed. In other examples, the distances between detected points and corresponding reference points may only be determined in particular directions. For instance, if the reference points correspond to a particular lane boundary, only distances of detected points to the left or to the right of the reference points on the lane boundary in a direction of travel may be determined.

FIG. 4C shows an example of determining distances between detected points and corresponding detected points. As previously noted, reference points 402, 404, 406, 408, and 410 may be identified as corresponding to detected points 412, 414, 416, 418, and 420. Accordingly, as shown in FIG. 4C, a distance 422 may be computed between points 402 and 412, a distance 424 may be computed between points 404 and 414, a distance 426 may be computed between points 406 and 416, a distance 428 may be computed between points 408 and 418, and a distance 430 may be computed between points 410 and 420.

As shown by block 308, method 300 of FIG. 3 may include determining a confidence buffer representing a threshold amount of variation associated with the prior map. The confidence buffer may be determined based on the distances between the detected points and corresponding reference points. In particular, a narrow confidence buffer may be chosen when the detected points match up well with corresponding reference points (for example, when most of the distances between detected points and corresponding reference points are small). For instance, if 90% of the detected points of a lane boundary are within a few feet of corresponding reference points, a confidence buffer of only a few feet may be chosen. Further, a greater confidence buffer may be chosen when the detected points do not match up well with corresponding reference points (for example, when a nontrivial number of distances between detected points and corresponding reference points are large). For instance, if over 50% of the detected points of a lane boundary are more than a few feet away from corresponding reference points, a confidence buffer of several meters may be chosen.

Figure 4D:
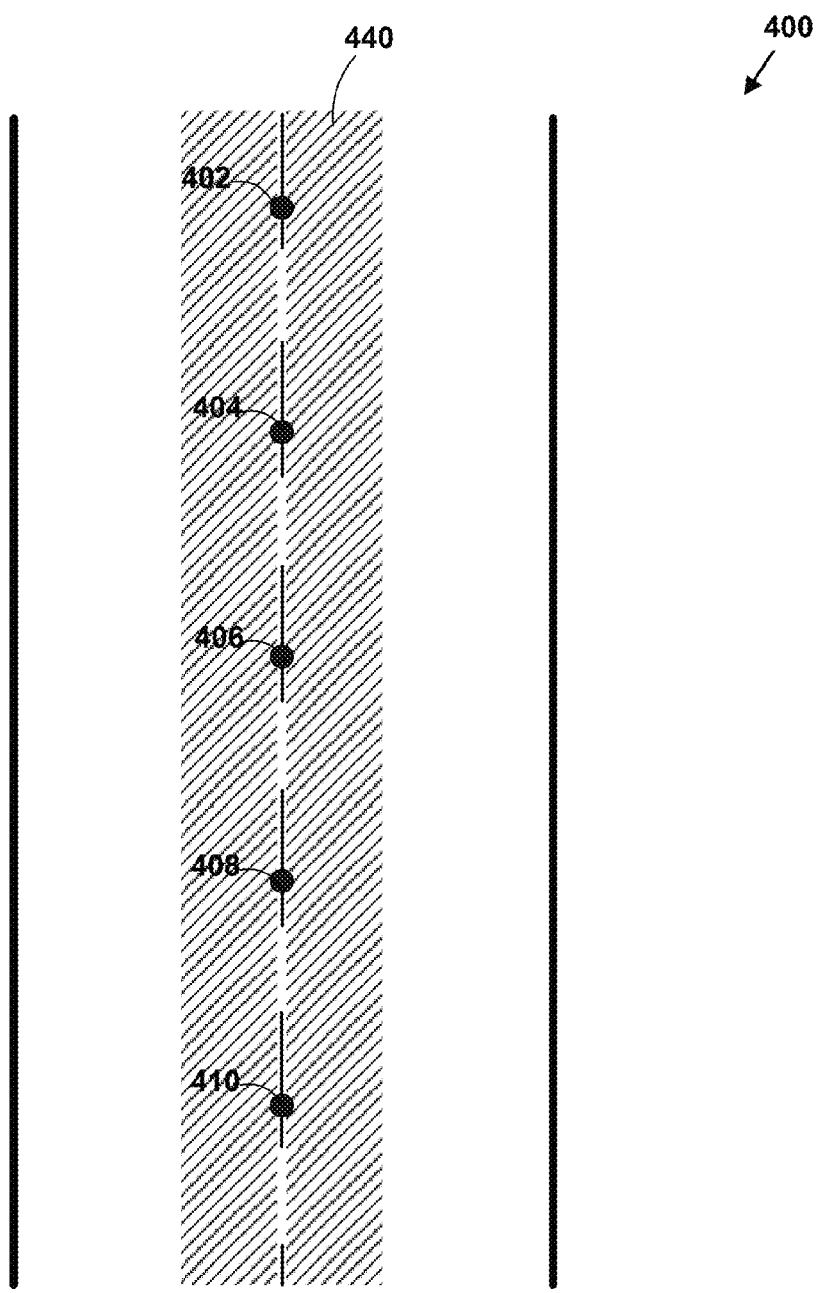
FIG. 4D is a schematic illustration of determining a confidence buffer associated with the prior map of the environment from FIG. 4A, according to an example embodiment.

FIG. 4D shows an example of a confidence buffer, according to an example embodiment. As shown, a confidence buffer 440 may be chosen representing a particular amount of variation from reference points 402, 404, 406, 408, and 410 from the prior map. In some examples, the confidence buffer 440 may be chosen to be the same amount to the right or left of reference points on a lane boundary from the prior map. In other examples, the confidence buffer 440 may be applied in other directions including forward/back and up/down as well or instead, depending on the particular application. In some instances, the confidence buffer may be chosen to be same amount in certain directions or in all directions. In additional examples, the confidence buffer may also be chosen to be different amounts in different directions. For instance, a greater confidence buffer may be used to filter detected points that are higher or lower than corresponding reference points as compared to the confidence buffer used to filter detected points that are to the left or right of corresponding reference points.

In some examples, determining the confidence buffer may involve determining confidence metric associated with the prior map, such as a likelihood that the prior map is inaccurate (e.g., a 0-to-1 index or some other type of numerical metric). Furthermore, the likelihood metric may be periodically updated as new detected points are received. For instance, if several recent detected points are a significant distance away from corresponding reference points, the likelihood metric may be increased. The likelihood metric may then be mapped to a confidence buffer via a function, a lookup table, or some other transformation. A larger confidence buffer may be chosen when the likelihood that the prior map is inaccurate is high.

In further examples, determining the confidence buffer may involve assigning weights to particular detected points and/or the distances between those particular detected points and corresponding reference points. For instance, a confidence buffer may be based on a weighted average of distances between detected points and corresponding reference points. Detected points that are more likely to be predictive of the accuracy of the prior map for future detected points may be assigned greater weights. In one example, detected points that were detected more recently may be assigned a greater weight than detected points that were detected in the past. Points detected longer ago may be less predictive of the accuracy of the prior map, for example, because aspects of the environment may have changed since the points were detected and/or because the points may be further away in distance from an area where points are currently being detected.

In other examples, determining the confidence buffer may involve assigning weights to particular detected points based on the distance between those points and a sensor which detected the points, such as a sensor of an autonomous vehicle. In some examples, sensors may be able to more accurately and/or reliably detect points which are closer in distance. Accordingly, the locations of detected points which are nearby may be better predictors of the accuracy of the prior map and may be given a greater weight in determining the confidence buffer.

In additional examples, determining the confidence buffer may involve determining a percentage of detected points that were not selected. For instance, a computing system may periodically evaluate the percentage of detected points which are being filtered out based on the prior map. In some examples, a threshold percentage of detected points that should be filtered out may be determined. For instance, it may be determined based on previous experience or data relating to similar environments that a particular sensing system is likely to detect a certain percentage of points that are noise and not associated with a real boundary line, such as 1% or 5% or 10%. The threshold percentage may be set to this level. Then, if it is determined that a higher percentage of detected points are being filtered out than the threshold percentage, the confidence buffer may be increased until the percentage of points being filtered out falls below the threshold percentage. In other examples, the percentage of points that were not selected may be used in other ways and/or in combination with other factors in determining the confidence buffer.

In further examples, determining the confidence buffer may involve determining a trend in the distances between detected points and corresponding reference points. For instance, it may be determined that the distances are increasing by a certain amount or certain percentage, decreasing by a certain amount or certain percentage, or oscillating between increasing and decreasing according to some identifiable pattern. Such trends may occur, for example, when a particular boundary line has been repainted over a particular stretch of road. The boundary line may be made to shift gradually in a particular direction by a consistent amount. In such instances, the trend in the distances between detected points and corresponding reference points may be used to determine the confidence buffer. For example, it may be determined that detected points which follow an identified trend may be likely to be real current points on a current boundary line as opposed to noise. A confidence buffer may then be chosen to ensure that such detected points following the trend are selected.

In additional examples, determining the confidence buffer and/or determining a likelihood that a prior map is inaccurate may involve using estimates based on other sensor(s) and/or algorithms. For example, a confidence buffer may be modified based on the trajectories of other moving vehicles within an environment. If other vehicles are moving in a way that does not follow boundary lines from a prior map, it may be determined that the prior map is less likely to be accurate and the confidence buffer may be increased, for example. In further examples, other prior sources of data about the environment may be used in determining the confidence buffer and/or a likelihood that a prior map is inaccurate as well or instead (e.g., information from another autonomous vehicle that passed through a region and/or information about recent construction history could indicate that certain areas are more likely to have been repainted recently).

As shown by block 308, method 300 of FIG. 3 may include selecting one or more of the detected points. A detected point may be selected if the distance between the detected point and the corresponding reference point is less than the confidence buffer. As previously noted, the confidence buffer may be the same amount in all directions, in which case a detected point may be selected if its three-dimensional distance from the corresponding reference point is less than the confidence buffer. In other examples, the confidence buffer may be different amounts depending on the direction. In those examples, a detected point may be selected if its distance from the corresponding reference point is less than the confidence buffer or within the confidence buffer in each of one or more different directions.

Figure 4E:
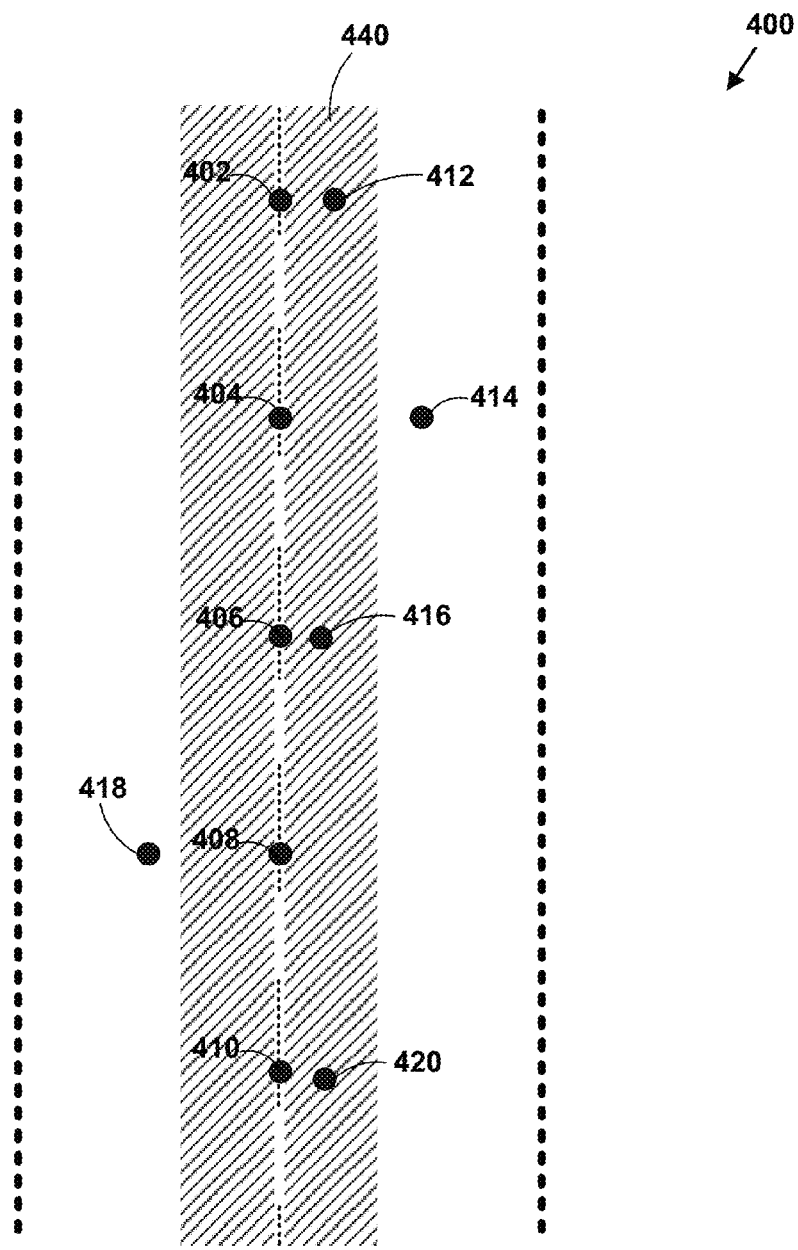
FIG. 4E is a schematic illustration of selecting certain detected points from FIG. 4B using the confidence buffer from FIG. 4D, according to an example embodiment.

FIG. 4E shows the selecting of certain detected points, according to an example embodiment. As shown, detected points 412, 416, and 420 may be determined to be within the confidence buffer of corresponding reference points and may therefore be selected. Detected points 414 and 418 may be determined to be outside the confidence buffer of corresponding reference points and may therefore be filtered out and not selected. In some examples, different confidence buffers may be applied to select or refrain from selecting certain detected points. For example, after refraining from selecting detected point 418, the confidence buffer may be increased before determining whether to select detected point 416. In additional examples, the confidence buffer could be updated after a certain number of detected point are received, after a certain time period has passed, or after a certain number or percentage of detected points have been selected or filtered out.

The selected points may be a current representation of a boundary marker on the roadway. As shown by block 312, method 300 of FIG. 3 may further involve using the selected points to direct an autonomous vehicle along the roadway. For instance, the selected points may be used to determine a current location of a lane boundary, a shoulder of a road, another type of road marker or sign, or a permanent structure in the environment. In some examples, the selected points could be used in conjunction with other information, such as reference points or other information from the prior map, in order to determine a current map of a portion of the environment.

Figure 4F:
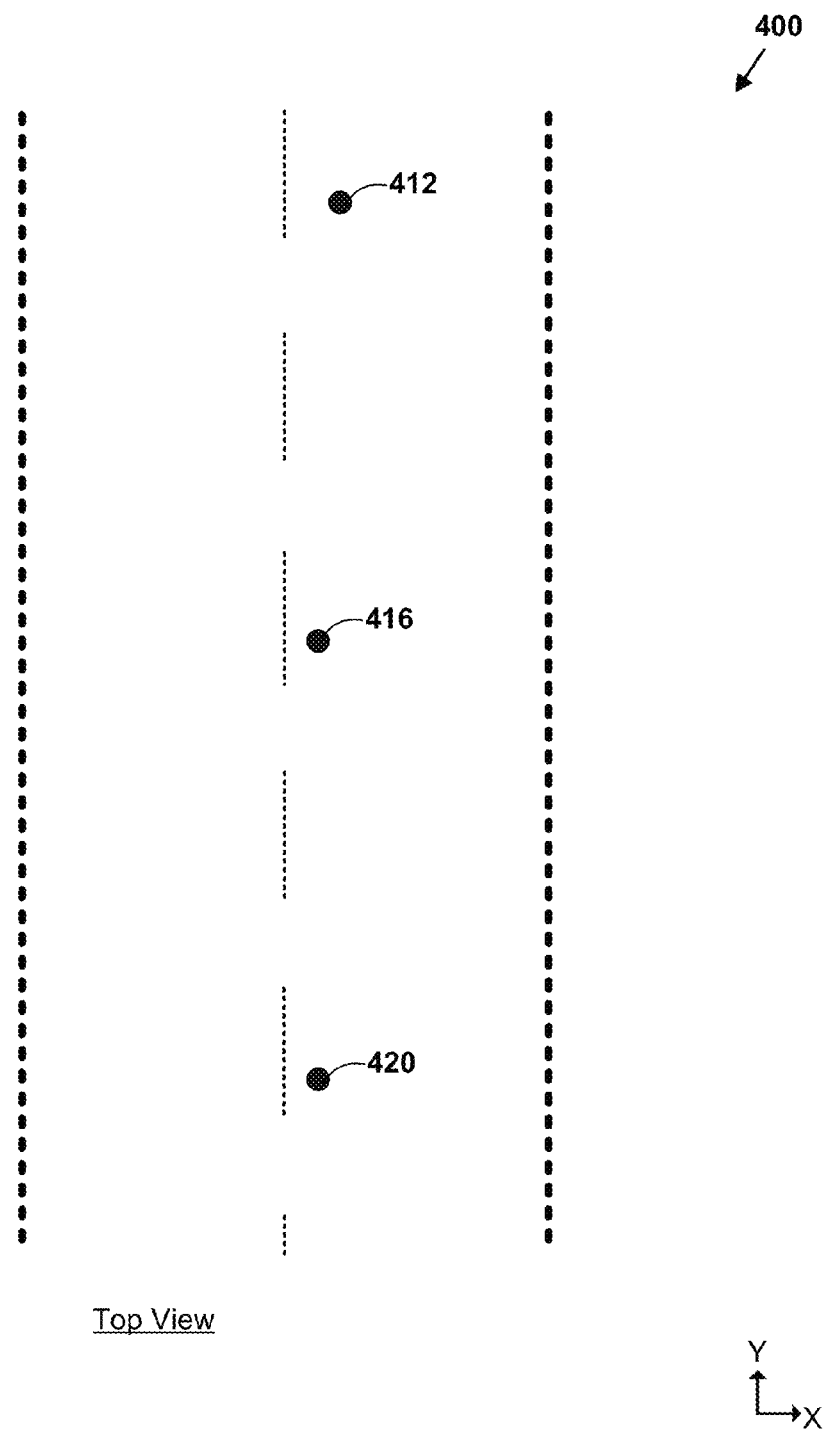
FIG. 4F is a top view of a current map of a portion of an environment based on the selected points from FIG. 4E, according to an example embodiment.
Figure 4G:
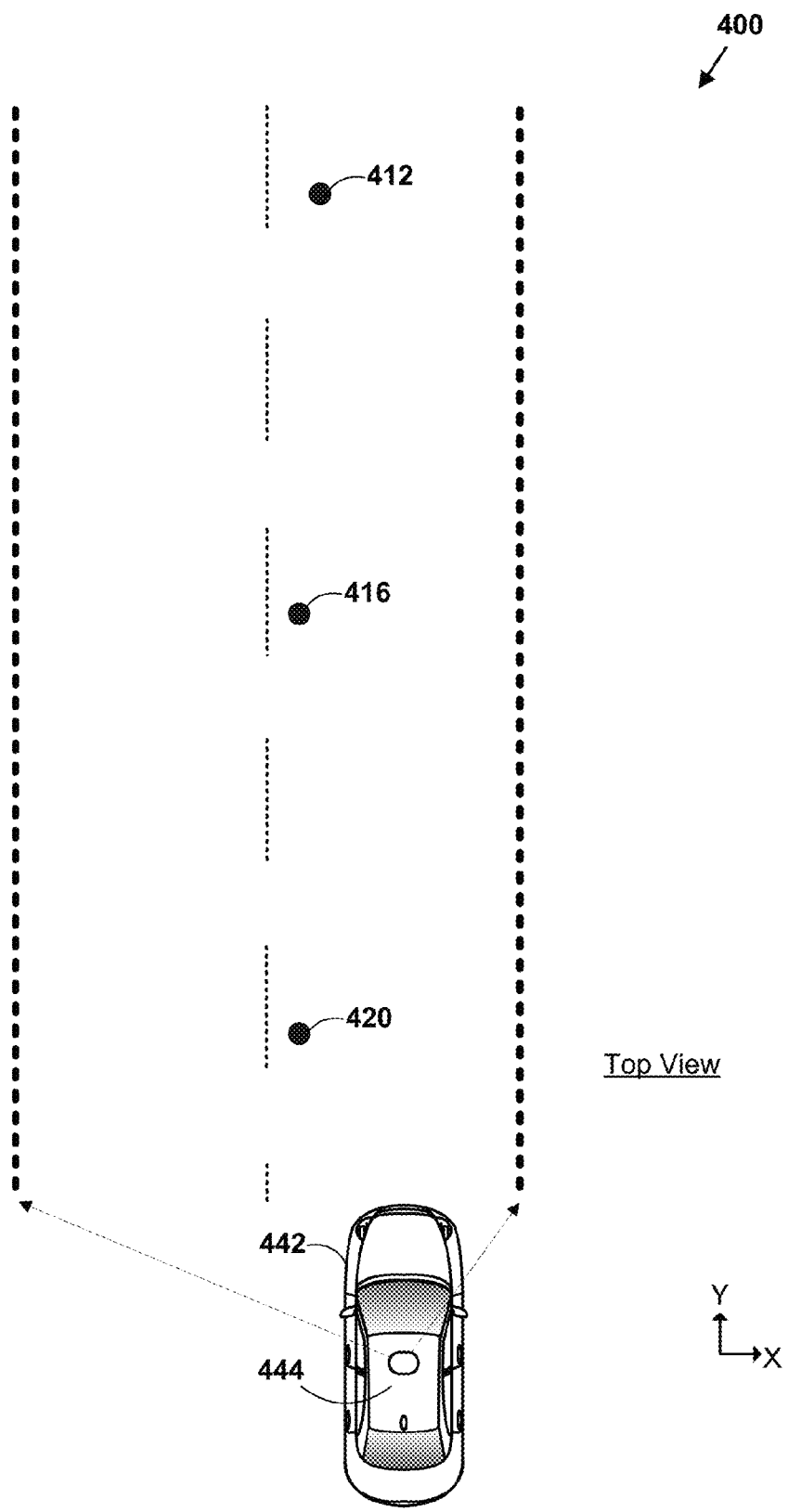
FIG. 4G is a top view of an autonomous vehicle navigating based on the current map from FIG. 4F, according to an example embodiment.

FIG. 4F shows a map of a portion of the environment, according to an example embodiment. As shown, selected points 412, 416, and 420 may form a portion of a current map of a lane boundary on a road. In one example, the selected points may have been detected by a sensor 444 on an autonomous vehicle 442, as shown by FIG. 4G. The selected points 412, 416, and 420 could be used alone or in conjunction with other information from the prior map or other sensor data about the environment to enable the vehicle 442 to carry out precise maneuvers or stay in its lane, for example.

Example methods, such as method 300 of FIG. 3 may be carried out in whole or in part by a vehicle and its subsystems. Accordingly, example methods could be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

Additionally, example methods, such as method 300, may be carried out by other types of systems as well. For instance, a mapping system, a GPS system, or other driver instructing system may use an example method to filter detected points on boundary lines or other features within an environment. Other types of services may benefit from using examples methods as well. For example, a factory could map painted lines, magnets, and/or fiducial markers and use the map to filter detected points from sensors on a robot or other automated manufacturing system.

Figure 5:
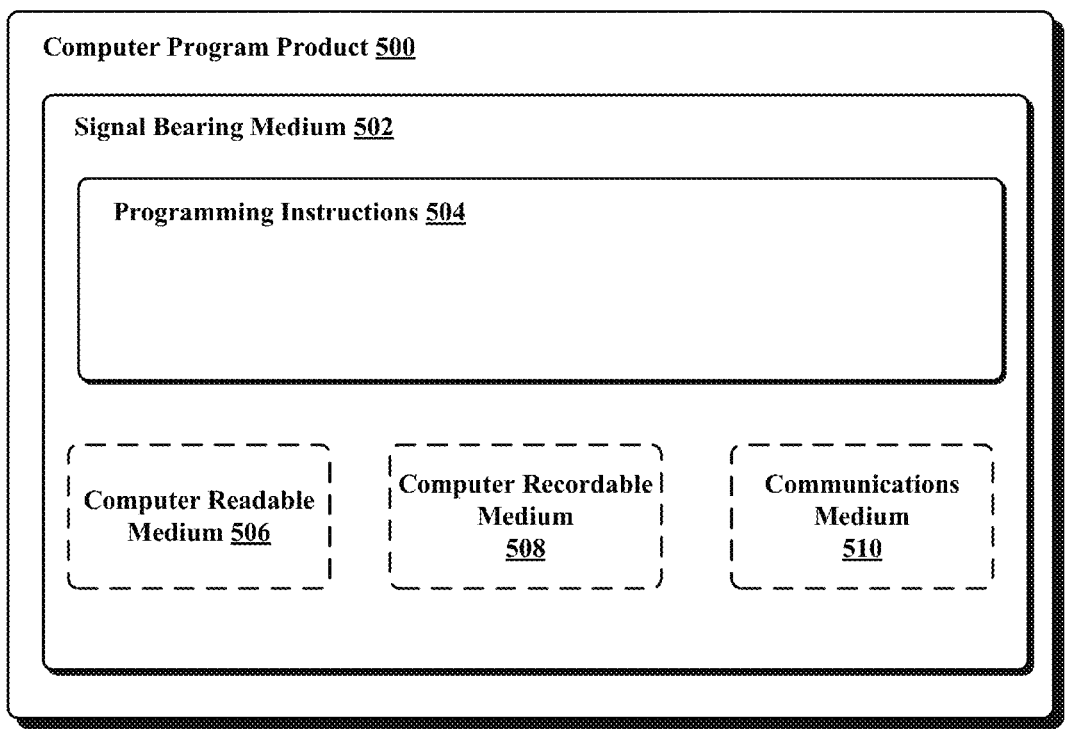
FIG. 5 is a schematic diagram of a computer program product, according to an example embodiment.

In some embodiments, the techniques disclosed herein may be implemented as computer program instructions encoded on a non-transitory computer-readable storage media in a machine-readable format, or on other non-transitory media or articles of manufacture (e.g., the instructions 115 stored on the data storage 114 of the computer system 112 of the vehicle 100). FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described herein. In some examples, the signal bearing medium 502 can be a non-transitory computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the example vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments are possible. The various aspects and embodiments disclosed herein are for purposes of illustration and are not intended to be limiting, with the true scope being indicated by the following claims.

We claim:

1. A computer-implemented method, comprising:
   receiving a location of a plurality of detected points on a roadway in an environment of an autonomous vehicle;
   determining, from a prior map of the roadway, a location of a plurality of reference points from a boundary marker on the roadway that correspond to the detected points on the roadway;
   determining distances between the detected points and the corresponding reference points based on the location of the detected points in the environment and the location of the reference points from the prior map of the roadway;
   selecting one or more of the detected points such that the distance between a selected detected point and a corresponding reference point is less than a confidence buffer;
   adjusting the confidence buffer based on a percentage of the detected points that were not selected; and
   using the selected points as a current representation of the boundary marker to direct the autonomous vehicle along the roadway.

2. The method of claim 1, wherein determining the location of the plurality of reference points comprises selecting a plurality of points from a continuous curve corresponding to the boundary marker on the prior map.

3. The method of claim 1, further comprising adjusting the confidence buffer in response to determining that more than half of the detected points were not selected.

4. The method of claim 1, wherein adjusting the confidence buffer based on the percentage of the detected points that were not selected comprises comparing the percentage to a predetermined threshold percentage.

5. The method of claim 1, further comprising:
   determining a confidence metric associated with a level of confidence in the prior map;
   periodically updating the confidence metric based at least in part on distances between detected points and corresponding reference points; and
   determining the confidence buffer as a function of the confidence metric.

6. The method of claim 1, further comprising determining the confidence buffer by assigning a greater weight to detected points that were detected more recently.

7. The method of claim 1, further comprising determining the confidence buffer by assigning a weight to detected points based on a distance of the detected points to a sensor which detected the points.

8. The method of claim 1, further comprising:
   determining a trend in the distances between detected points and corresponding reference points; and
   based on a distance between a given detected point and a corresponding reference point following the trend, selecting the given detected point.

9. A vehicle, comprising:
   a computing system configured to:
   receive a location of a plurality of detected points on a roadway in an environment of an autonomous vehicle;
   determine, from a prior map of the roadway, a location of a plurality of reference points from a boundary marker on the roadway that correspond to the detected points on the roadway;
   determine distances between the detected points and the corresponding reference points based on the location of the detected points in the environment and the location of the reference points from the prior map of the roadway;
   select one or more of the detected points such that the distance between a selected detected point and a corresponding reference point is less than a confidence buffer;
   adjust the confidence buffer based on a percentage of the detected points that were not selected; and
   use the selected points as a current representation of the boundary marker to direct the autonomous vehicle along the roadway.

10. The vehicle of claim 9, wherein the control system is configured to determine the location of the plurality of reference points by selecting a plurality of points from a continuous curve corresponding to the boundary marker on the prior map.

11. The vehicle of claim 9, wherein the control system is further configured to adjust the confidence buffer in response to determining that more than half of the detected points were not selected.

12. The vehicle of claim 9, wherein the control system is configured to adjust the confidence buffer based on the percentage of the detected points that were not selected by comparing the percentage to a predetermined threshold percentage.

13. The vehicle of claim 9, wherein the control system is further configured to:
   determine a confidence metric associated with a level of confidence in the prior map;
   periodically update the confidence metric based at least in part on distances between detected points and corresponding reference points; and
   determine the confidence buffer as a function of the confidence metric.

14. The vehicle of claim 9, wherein the control system is further configured to determine the confidence buffer by assigning a greater weight to detected points that were detected more recently.

15. The vehicle of claim 9, wherein the control system is further configured to determine the confidence buffer by assigning a weight to detected points based on a distance of the detected points to a sensor which detected the points.

16. A non-transitory computer readable medium having stored therein instructions, that when executed by a computing system, cause the computing system to perform functions comprising:
   receiving a location of a plurality of detected points on a roadway in an environment of an autonomous vehicle;
   determining, from a prior map of the roadway, a location of a plurality of reference points from a boundary marker on the roadway that correspond to the detected points on the roadway;
   determining distances between the detected points and the corresponding reference points based on the location of the detected points in the environment and the location of the reference points from the prior map of the roadway;

selecting one or more of the detected points such that the distance between a selected detected point and a corresponding reference point is less than a confidence buffer;

adjusting the confidence buffer based on a percentage of the detected points that were not selected; and using the selected points as a current representation of the boundary marker to direct the autonomous vehicle along the roadway.

17. The non-transitory computer readable medium of claim 16, wherein determining the location of the plurality of reference points comprises selecting a plurality of points from a continuous curve corresponding to the boundary marker on the prior map.

18. The non-transitory computer readable medium of claim 16, wherein the functions further comprise adjusting the confidence buffer in response to determining that more than half of the detected points were not selected.

19. The non-transitory computer readable medium of claim 16, wherein adjusting the confidence buffer based on the percentage of the detected points that were not selected comprises comparing the percentage to a predetermined threshold percentage.

20. The non-transitory computer readable medium of claim 16, the functions further comprising:
   determining a confidence metric associated with a level of confidence in the prior map;
   periodically updating the confidence metric based at least in part on distances between detected points and corresponding reference points; and
   determining the confidence buffer as a function of the confidence metric.

21. The non-transitory computer readable medium of claim 16, the functions further comprising:
   determining the confidence buffer by assigning a greater weight to detected points that were detected more recently.

* * * * *